(12) United States Patent
Taira

(10) Patent No.: US 6,294,279 B1
(45) Date of Patent: Sep. 25, 2001

(54) SOLID-ELECTROLYTE FUEL CELL AND METHOD FOR MANUFACTURING THE SAME

(75) Inventor: Hiroaki Taira, Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/145,607

(22) Filed: Sep. 2, 1998

(30) Foreign Application Priority Data

Sep. 16, 1997 (JP) ..................................... 9-250790

(51) Int. Cl.[7] .............. H01M 8/10; H01M 8/24
(52) U.S. Cl. .............. 429/30; 429/32; 29/623.3; 29/623.4
(58) Field of Search .................. 429/30, 32, 33; 29/623.3, 623.4

(56) References Cited

U.S. PATENT DOCUMENTS

| | | | |
|---|---|---|---|
| 3,492,165 | * 1/1970 | Guillot et al. | 429/32 |
| 5,063,122 | * 11/1991 | Rohr | 429/32 |
| 5,186,806 | * 2/1993 | Clark et al. | 429/30 X |
| 5,399,442 | * 3/1995 | Shundo | 429/32 |
| 5,589,285 | * 12/1996 | Cable et al. | 429/33 X |

\* cited by examiner

Primary Examiner—Stephen Kalafut
(74) Attorney, Agent, or Firm—Ostrolenk, Faber, Gerb & Soffen, LLP

(57) ABSTRACT

A solid-electrolyte fuel cell has a three-layered film in which an air electrode is arranged on one surface of a solid-electrolyte film and a fuel electrode is arranged on the other surface, a support layer is bonded to an electrode of the three-layered film, and a collecting layer is bonded with another surface of the support layer and the fuel electrode and the collecting layer, or the air electrode and the collecting layer are electrically connected to each other through holes formed in the thickness direction of the main surface of the support layer.

12 Claims, 6 Drawing Sheets

SOLID-ELECTROLYTE FUEL CELL AND METHOD FOR MANUFACTURING THE SAME

BACKGROUND OF THE INVENTION

1. Field of the Invention

The present invention relates to a solid-electrolyte fuel cell and a method for manufacturing the solid-electrolyte fuel cell.

2. Description of the Related Art

A solid-electrolyte fuel cell comprises a plurality of three-layered films each being a fuel electrode, a solid-electrolyte film and an air electrode. Each three-layered film has a flat plate shape and is conventionally supported by either a self-standing film system or a supported film system.

Figure 1:
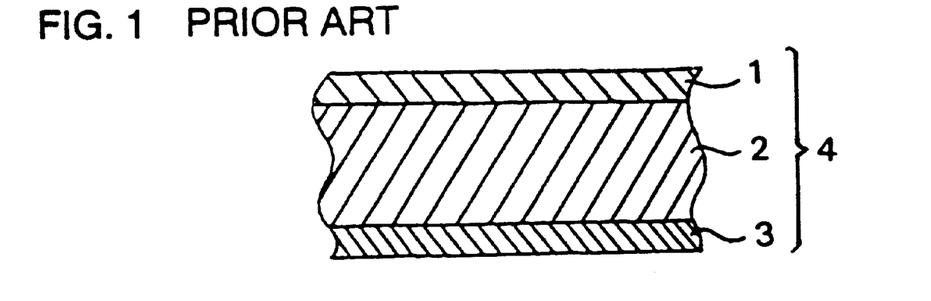
FIG. 1 is a fragmentary sectional view of the three-layered film in a conventional solid-electrolyte fuel cell of the self-standing film system.

In the self-standing film system, as indicated in the fragmentary sectional view of the three-layered film in FIG. 1, a solid-electrolyte film 2 thicker than each of the fuel electrode 1 and air electrode 3 of the three-layered film 4 comprising the fuel cell supports the structure of the three-layered film 4.

Figure 2A:
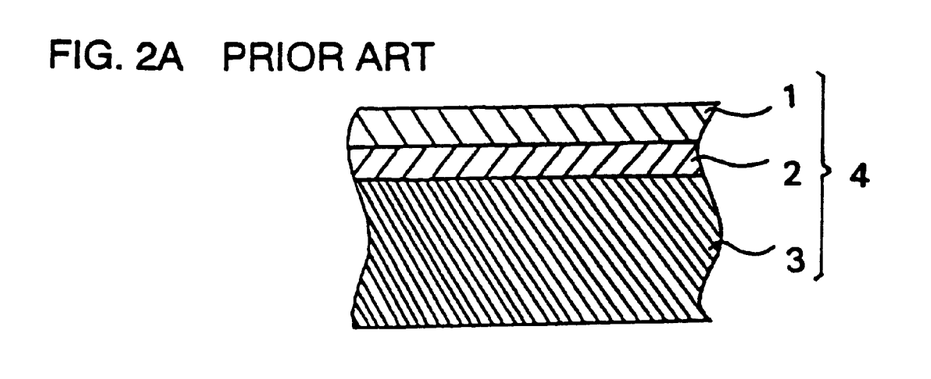
FIG. 2A is a fragmentary sectional view of the three-layered film in which the air electrode is the support layer in a conventional solid-electrolyte fuel cell of the supported film system.
Figure 2B:
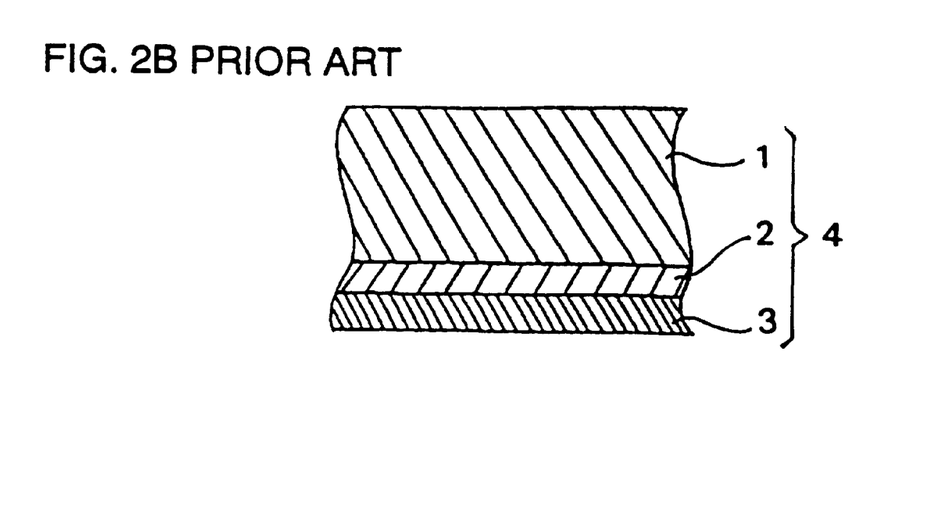
FIG. 2B is a fragmentary sectional view of the three-layered film in which the fuel electrode is the support layer in a conventional solid-electrolyte fuel cell of the supported film system.

In the supported film system, the structure of the three-layered film is supported by parts other than the solid-electrolyte film, and as indicated in the fragmentary sectional view of the three-layered film in FIG. 2A, the structure of the three-layered film 4 can be supported by setting the thickness of the air electrode 3 larger than that of the fuel electrode 1 and the solid-electrolyte film 2, or setting the thickness of the fuel electrode 1 to be larger than that of the solid-electrolyte film 2 and the air electrode 3 as indicated in FIG. 2B.

Although the self-standing film system is simple in structure, there has been the problem that the internal resistance of the cell becomes large because the solid-electrolyte film is thick.

In the supported film system, the thickness of the solid-electrolyte film itself can be reduced, and the internal resistance of the cell can be controlled to be low. However, the material of the air electrode of $(La, Sr)MnO_3$ is lower in strength than the YSZ (yttrium stabilized zirconia) generally used for the material of the solid-electrolyte film, and the air electrode is porous to permit the air gas to pass through the electrode. Therefore, when the air electrode is used for the support layer, for example, its thickness must be fairly large so that a supporting strength equivalent to that of the solid-electrolyte film in the self-standing film system is provided. This is the same with the case where the fuel electrode is the support layer in place of the air electrode.

Thus, the cell which is the basic unit of power generation of the fuel cell is thicker in the case of the supported film system than that of the self-standing film system, and as a result, there is a problem in that the volume of the solid-electrolyte fuel cell is increased. At the same time, the electric characteristics of the electrode and the reactivity with the solid-electrolyte film with which the electrode is bonded must be taken into full consideration, and it has been difficult to regulate the coefficient of thermal expansion of the interconnector added to electrically connect adjacent cells to each other by supplying the gas to the electrodes under consideration.

In view of the forgoing, there is a need for a solid-electrolyte fuel cell having a supporting strength similar to that of the structure where the solid-electrolyte film is the support layer although the solid-electrolyte film is not the support layer, the increase of the volume is controlled, and the coefficient of thermal expansion between the support layer and the interconnector can be easily regulated. There is also a need for a method for manufacturing the solid-electrolyte fuel cell.

SUMMARY OF THE INVENTION

The present invention is directed to a solid-electrolyte fuel cell that satisfied this need. The solid-electrolyte fuel cell comprises a three-layered film in which an air electrode is arranged on one surface of the solid-electrolyte film and a fuel electrode is arranged on the other surface, a support layer having one surface joined to the air electrode or the fuel electrode of the three-layered film, and a collecting layer which is joined with the other surface of the support layer, and is characterized in that the fuel electrode and the collecting layer, or the air electrode and the collecting layer are electrically connected through holes formed in the thickness direction of the main surface of the support layer.

In manufacturing such a solid-electrolyte fuel cell, when the formed bodies for the solid-electrolyte film, the air electrode, the fuel electrode, the support layer in which holes are formed in the thickness direction of the main surface, and the collecting layer are respectively laminated to form a laminated body, the laminated body is pressed, and the material of the formed body for the air electrode or the fuel electrode, and the material of the collecting layer are filled into the hole of the support layer, the air electrode or the fuel electrode can be easily connected to the collecting layer through the hole in the support layer.

Similarly, the formed body for the solid-electrolyte film, the air electrode, the fuel electrode, and the support layer in which holes are formed in the thickness direction of the main surface are respectively laminated to form a laminated body, the laminated body is baked, and a paste of the electrode material for the collecting layer is coated on the surface of the support layer to form the collecting layer, and when the electrode material for the collecting layer is filled in the hole formed in the support layer, the air electrode or the fuel electrode can be easily connected to the collecting layer through the hole in the support layer.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 3:
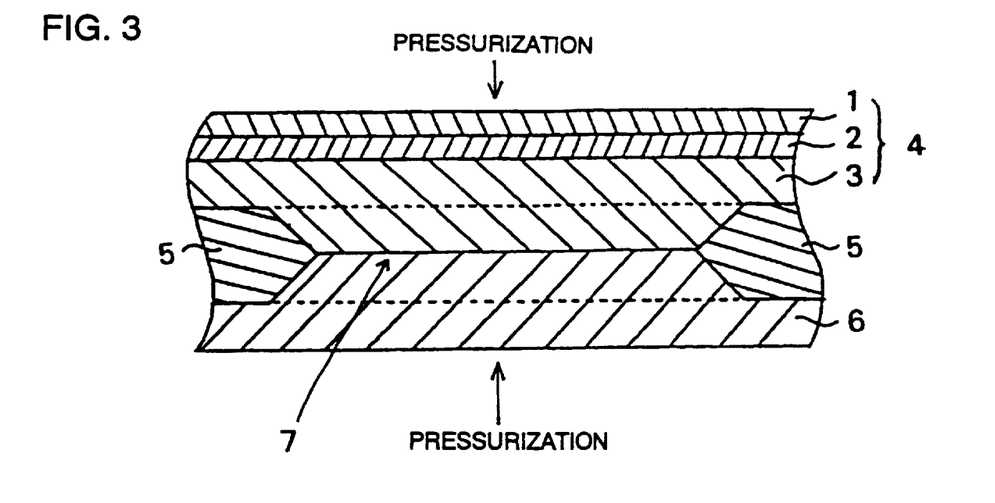
FIG. 3 is a fragmentary sectional view of the fuel electrode, the solid-electrolyte film, the air electrode, the support layer, and the collecting layer after the pressing in the solid-electrolyte fuel cell of the present invention.

As shown in FIG. 3, a solid-electrolyte fuel cell of the present invention comprises a three-layered film 4, a support layer 5 and a collecting layer 6. The support layer 5 is sandwiched between the three-layered film 4 and the collecting layer 6. The support layer 5, the three-layered film 4 and the collecting layer 6 form a unit cell of the solid-electrolyte fuel cell.

The three-layered film includes a fuel electrode 1, a solid-electrolyte film 2 and an air electrode 3 and is formed such that the air electrode 3 is arranged on one surface of the solid-electrolyte film 2 and that the fuel electrode 1 is arranged on the other surface of the solid-electrolyte film 2.

One major surface of the support layer 5 is joined with the air electrode 3 and the other major surface of the support layer 5 is joined with the collecting layer 6. The support layer 5 has a plurality of through holes 7 passing between the two major surface thereof, and the air electrode 3 and the collecting layer 6 are in contact with and electrically connected with each other through the through holes 7. In the structure specifically shown in FIG. 3, both of the air electrode 3 and the collecting layer 6 project toward the through holes 7 to achieve the physical and electrical connect.

The air electrode 3 and the collecting layer 6 may have a different structure to achieve the physical and electrical connect therebetween. For example, as shown in FIG. 4, the through holes 7 of the support layer 5 may be substantially filled with only the projected portion of the collecting layer 6.

Figure 4:
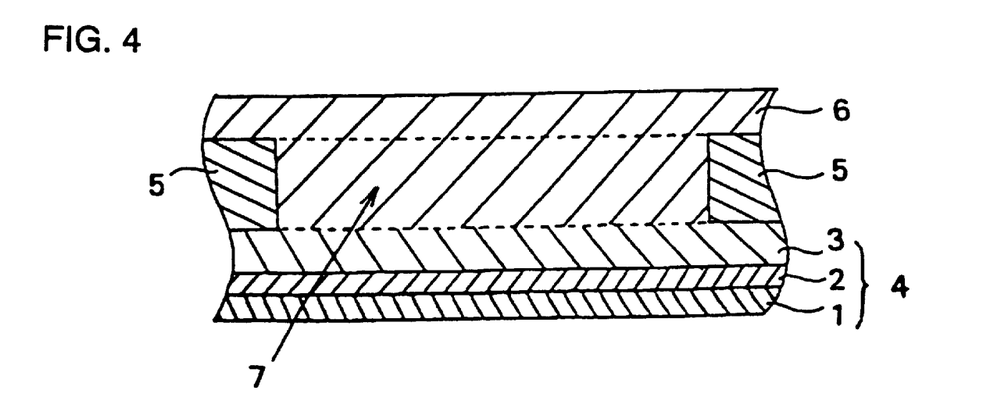
FIG. 4 is a fragmentary sectional view of the collecting layer, the support layer, the air electrode, the solid-electrolyte film, and the fuel electrode after baking the collecting layer in the solid-electrolyte fuel cell of the present invention.

Although the support layer 5 is formed on the air electrode 3 in the solid-electrolyte fuel cell shown in FIG. 3 or FIG. 4, the support layer 5 may be provided on the fuel electrode 1, and the fuel electrode 1 may be in contact with and electrically connected with the collecting layer 6.

In this structure, neither the solid-electrolyte film, the air electrode nor the fuel electrode of the three-layered film is used for the support layer, but another independent member is employed for the support layer. Therefore, by selecting an appropriate material for the support layer, the solid-electrolyte fuel cell of the present invention is provided with a strength similar to that of the supporting structure of the three-layered film of the self-standing system while the increase in volume of the solid-electrolyte fuel cell is prevented.

In addition, although the supporting strength of the support layer should be taken into consideration, its electric characteristics need not be taken into consideration, which is different from the case where the air electrode or the fuel electrode is the support layer. As a result, it becomes easier to adjust the coefficient of thermal expansion between the support layer and the interconnector.

Hereinafter, the present invention is explained referring to the more specific examples.

EXAMPLE 1

Lanthanum oxide, strontium carbonate, manganese carbonate, zirconium oxide, yttrium oxide, and nickel oxide are prepared as the starting raw materials.

A powder of the mixture of nickel oxide and zirconium oxide to which yttrium oxide is added (8 mol. %) is prepared as the material for the fuel electrode from the starting raw materials. A binding agent (polyvinyl butyral binder) and an appropriate amount of the solvent (ethanol and toluene) is added to the powder to obtain a slurry, and a green sheet for the fuel electrode of 50 μm in thickness is prepared from the slurry using the doctor blade method. The green sheet is cut into the dimensions of 160 mm (longitudinal)×160 mm (transverse).

Then, a powder of zirconium oxide to which 8 mol. % yttrium oxide was added, is prepared as the material for the solid-electrolyte film from the starting raw materials. The binding agent and the solvent in an appropriate quantity is added to the powder to obtain the slurry in a similar manner to the green sheet for the fuel electrode, and the green sheet for the solid-electrolyte film of 50 μm in thickness is prepared from the slurry using the doctor blade method. The green sheet is cut to the same dimensions in the longitudinal and transverse directions as those of the green sheet for the fuel electrode.

A powder of $La_{0.7}Sr_{0.3}MnO_3$ is prepared as the material of the air electrode and the material of the collecting layer from the starting raw materials. The binding agent and the solvent of appropriate quantity is added to the powder to obtain the slurry in a similar manner to the green sheet for the fuel electrode, and green sheets for the air electrode and the collecting layer of 100 μm in thickness are prepared from the slurry using the doctor blade method, and cut to the same dimensions in the longitudinal and transverse directions as those of the green sheet for the fuel electrode.

A zirconium oxide powder to which 3 mol. % yttrium oxide was added is prepared as the material for the support layer from the starting raw materials. The binding agent and the solvent in an appropriate quantity is added to the powder to obtain the slurry in a similar manner to the green sheet for the fuel electrode, a green sheet for the support layer of 200 μm in thickness is prepared from the slurry using the doctor blade method, and the green sheet is cut to the same dimensions in the longitudinal and transverse directions as those of the green sheet for the fuel electrode. In addition, through holes of about 3 mm in diameter are punched in the thickness direction of the main surface of the green sheet for the support layer leaving its peripheral edge part intact and keeping circumferential end parts of the holes apart from each other by 1 mm.

Figure 5:
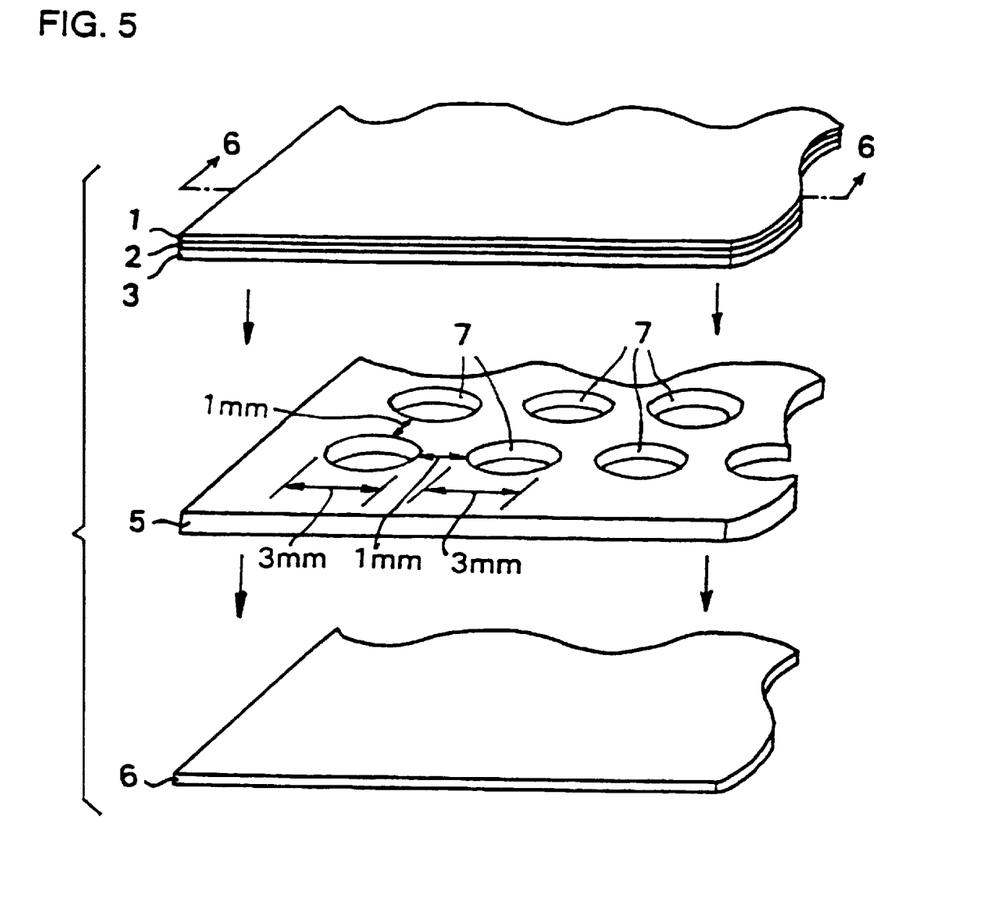
FIG. 5 is a fragmentary sectional view of the fuel electrode, the solid-electrolyte film, the air electrode, the support layer in which holes are formed, and the collecting layer before pressing in the solid-electrolyte fuel cell of the present invention.

Respective green sheets are stacked in the order of the fuel electrode 1, the solid-electrolyte film 2, the air electrode 3, the support layer 5 having holes 7 formed in the thickness direction, and the collecting layer 6 to form the laminated body as indicated in the partly exploded perspective view in FIG. 5.

Figure 6:
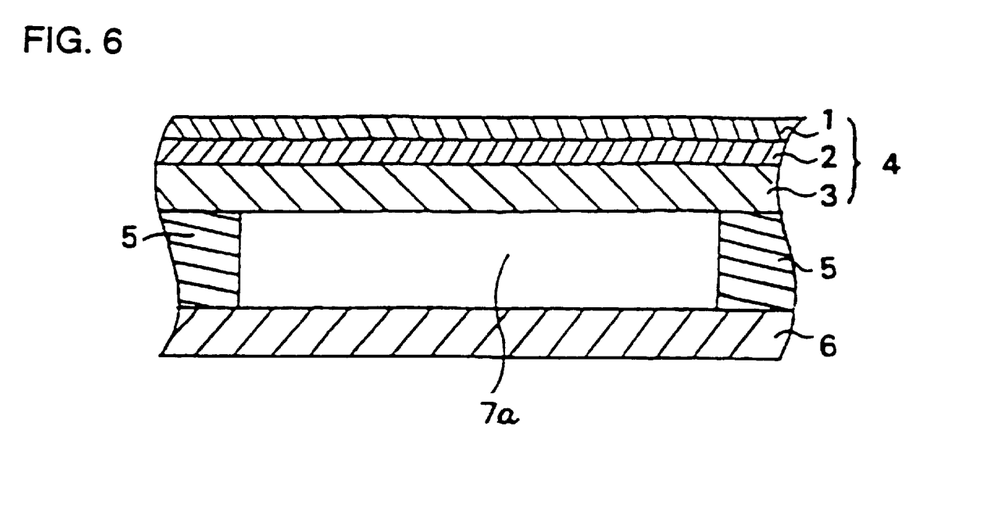
FIG. 6 is a fragmentary sectional view taken along A—A in FIG. 5.

A fragmentary sectional view is shown in FIG. 6 taken along the line A—A passing through the center part of the hole 7 in the support layer 5 in the partly exploded perspective view in FIG. 5.

Successively, the laminated body is placed in a plastic bag, the bag is evacuated to realize a vacuum condition, and the laminated body is pressed using a warm hydrostatic press to form the laminated body shown in FIG. 3. In the present embodiment, a common electrode material ($La_{0.7}Sr_{0.3}MnO_3$) for the air electrode 3 and the collecting layer 6 is used, and due to the pressurization in pressing by the warm hydrostatic press, the electrode material is filled into the holes (the parts between the broken lines) in the support layer 5 from the air electrode 3 and the collecting layer 6 above and below the support layer 5, and as a result, the air electrode 3 is electrically connected to the collecting layer 6 through the holes in the support layer 5.

Then, the pressed laminated body is taken out of the plastic bag, and baked for 2 hours at the temperature of 1300° C. to obtain a sintered body.

EXAMPLE 2

Similar to Example 1, green sheets to be respectively used for the fuel electrode, the solid-electrolyte film, the air electrode, and the support layer are prepared.

More specifically, lanthanum oxide, strontium carbonate, manganese carbonate, zirconium oxide, yttrium oxide, and nickel oxide are prepared respectively as the starting raw materials. Powder is prepared from the starting raw materials, the binding agent and the solvent is added to the powder to obtain a slurry, and the green sheet (50 $\mu$m in thickness) for the fuel electrode, the green sheet (50 $\mu$m in thickness) for the solid-electrolyte film, the green sheet (100 $\mu$m in thickness) for the air electrode, and the green sheet (200 $\mu$m in thickness) for the support layer are respectively prepared.

The respectively obtained green sheets are cut to the dimensions of 160 mm (longitudinal)×160 mm (transverse) in a similar manner to Example 1.

Holes of about 3 mm in diameter are punched in the thickness direction of the main surface of the green sheet for the support layer inward of its peripheral edges and keeping the circumferential end parts of the holes apart from each other by 1 mm.

Figure 7:
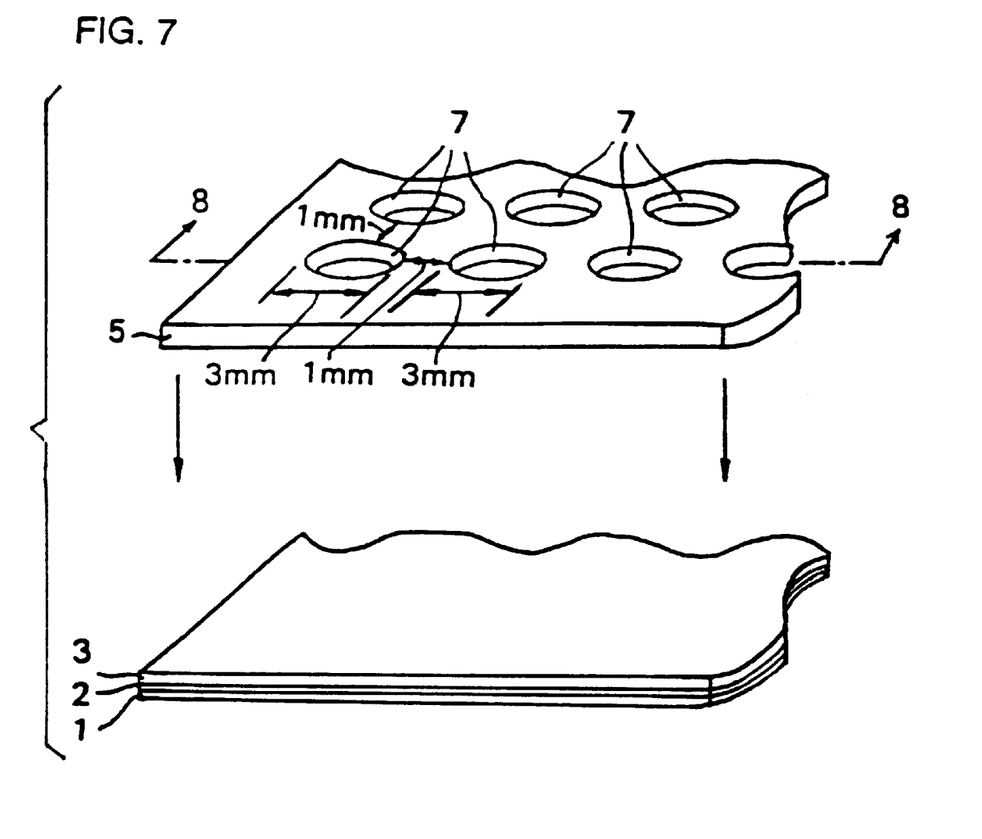
FIG. 7 is a partly exploded perspective view of the support layer in which holes are formed, the air electrode, the solid-electrolyte film, and the fuel electrode in the solid-electrolyte fuel cell of the present invention.

These respective green sheets are stacked in the order of the fuel electrode 1, the solid-electrolyte film 2, the air electrode 3, and the support layer 5 having the holes formed in the thickness direction to form the laminated body as indicated in the partly exploded perspective view of FIG. 7, and the laminated body is baked for 2 hours at the temperature of 1300° C. to obtain a sintered body.

Figure 8:
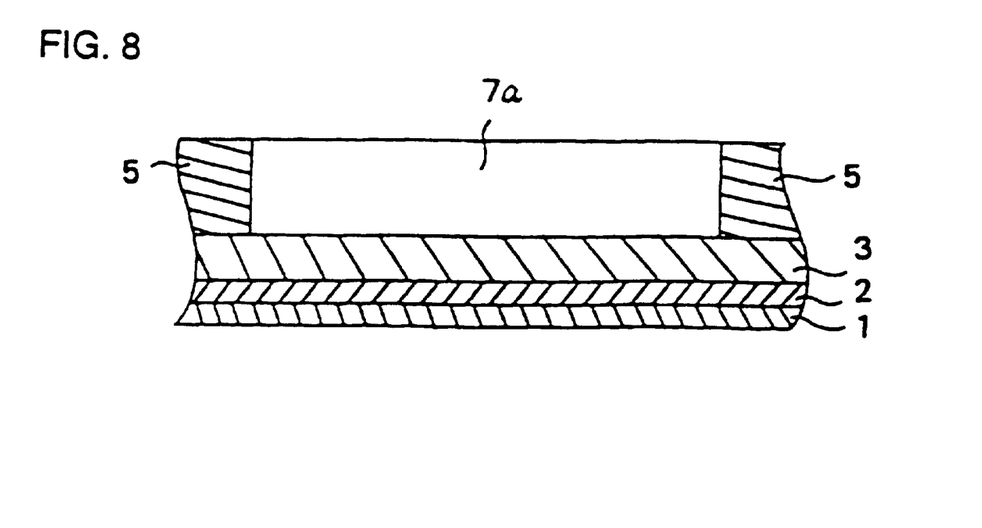
FIG. 8 is a fragmentary sectional view taken along B—B in FIG. 7.

FIG. 8 is a fragmentary sectional view of the sintered body taken along the line B—B passing through the center part of the holes 7 in the support layer 5 in the partly exploded perspective view of FIG. 7.

The same powder of $La_{0.7}Sr_{0.3}MnO_3$ as the material for the air electrode is prepared for the material for the collecting layer, and solvent is added to the powder to prepare the paste of electrode material for the collecting layer.

The paste of the electrode material for the collecting layer is screen-printed on the surface of the support layer of the previously obtained sintered body to form the collecting layer so as to be 100 $\mu$m in thickness, and the collecting layer is dried and then, baked.

FIG. 4 is a fragmentary sectional view of the collecting layer which is formed and baked on the surface of the support layer. In the present embodiment, a common electrode material ($La_{0.7}Sr_{0.3}MnO_3$) is used for the air electrode 3 and the collecting layer 6, and due to the screen-printing of the paste of the electrode material for the collecting layer on the surface of the support layer, the electrode material is filled into the holes (the parts between the broken lines) in the support layer 5, and as a result, the air electrode 3 is electrically connected to the collecting layer 6 through the holes in the support layer 5.

In the present embodiment, the electrode material ($La_{0.7}Sr_{0.3}MnO_3$) filled in the holes in the support layers 5 is porous, and the air gas is permeable in a similar manner in the porous air electrode 3 and the porous collecting layer 6.

In the present embodiment, the support layer of 256 $cm^2$ in area (dimensions: 160 mm (longitudinal)×160 mm (transverse)) and 200 $\mu$m in thickness, is prepared, and zirconium oxide to which 3 mol. % yttrium oxide is added, is used as a high strength material. Thus, even when the area of the support layer is further increased up to 400 $cm^2$, the thickness can be suppressed to approximately 500 $\mu$m.

Further, as indicated in the present embodiment, no electrical characteristics are required in the independent support layer since it is not used as the electrode, and, for example, if $Al_2O_3$, etc., is added to the support layer of $ZrO_2$ containing 3 mol. % $Y_2O_3$, which is excellent in strength, the strength of the support layer can be further improved, and the coefficient of thermal expansion can be further facilitated.

COMPARATIVE EXAMPLE 1

The structure of the supported film system in which the air electrode is the support layer is manufactured as a comparative example 1. The same material in the same thickness as that in Examples 1 and 2 is used in the fuel electrode and the solid-electrolyte film while an air electrode thicker than those in the embodiments 1 and 2 is formed in order to provide the equivalent supporting strength to that of the Examples 1 and 2 using the independent support layer of the same material as that in the Examples 1 and 2.

More specifically, the comparative example is prepared using the respective green sheets for the fuel electrode (50 $\mu$m in thickness), for the solid-electrolyte film (50 $\mu$m in thickness), for the air electrode (1000 $\mu$m in thickness), and for the collecting layer (10 $\mu$m in thickness) manufactured in a similar manner to those in the Example 1. In the structure of the comparative example, the air electrode is sufficiently thick, and thus, a green sheet for the collecting layer thinner (10 $\mu$m in thickness) than that in the Example 1, is used.

The green sheets are laminated in the order of the fuel electrode, the solid-electrolyte film, the air electrode, and the collecting layer to form the laminated body, the laminated body is placed in a plastic bag, the bag is evacuated to realize a vacuum condition, and the laminated body is pressed using the warm hydrostatic press.

Then, the pressed laminated body is taken out of the plastic bag, and baked for two hours at the temperature of 1300° C. to obtain a sintered body.

Figure 9:
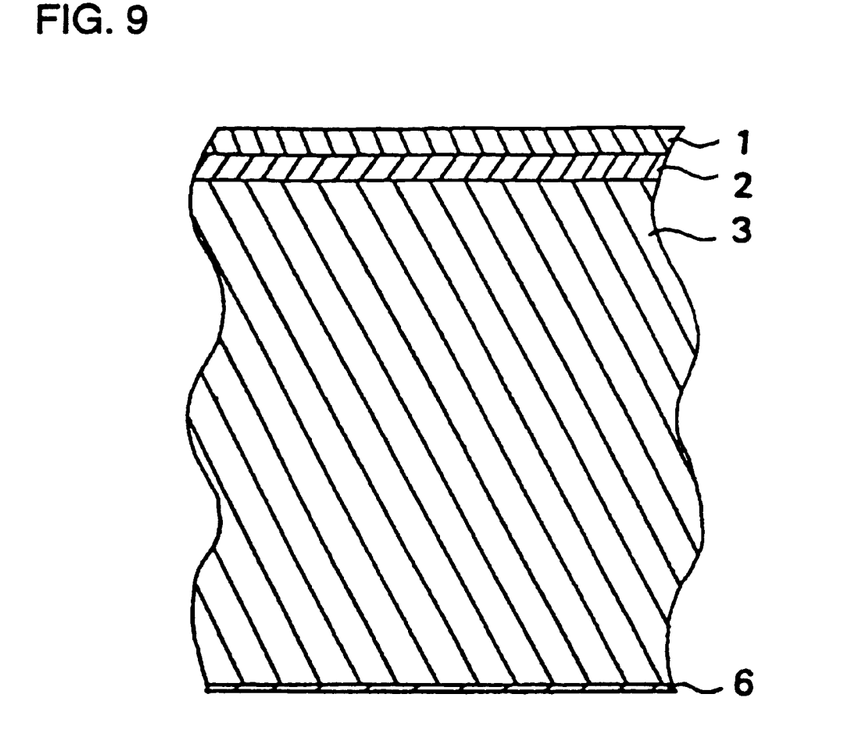
FIG. 9 is a fragmentary sectional view of the fuel electrode, the solid-electrolyte film, the air electrode, and the collecting layer of the comparative example 1.

FIG. 9 is a fragmentary sectional view of the obtained sintered body in which 1 denotes the fuel electrode, 2 denotes the solid-electrolyte film, 3 denotes the air electrode, and 6 denotes the collecting layer.

COMPARATIVE EXAMPLE 2

As a Comparative Example 2, the structure of the self-standing film system in which the solid-electrolyte film is the support layer, is manufactured. The same material in the same thickness as that in the Examples 1 and 2 is used in the fuel electrode, while a green sheet for the solid-electrolyte film thicker than those in the Examples 1 and 2 is used in order to provide the equivalent supporting strength to that of the Examples 1 and 2 having the independent support layer. The air electrode is as thick as the fuel electrode.

More specifically, the respective green sheets for the fuel electrode (50 $\mu$m in thickness), for the solid-electrolyte film (200 $\mu$m in thickness), for the air electrode (50 $\mu$m in thickness), and for the collecting layer (10 $\mu$m in thickness) are manufactured in a similar manner to those in the Example 1.

The green sheets are laminated in the order of the fuel electrode, the solid-electrolyte film, the air electrode, and the collecting layer to form the laminated body, the laminated body is placed in a plastic bag, the bag is evacuated to realize a vacuum condition, and the laminated body is pressed using the warm hydrostatic press.

Then, the pressed laminated body is taken out of the plastic bag, and baked for two hours at the temperature of 1300° C. to obtain a sintered body.

Figure 10:
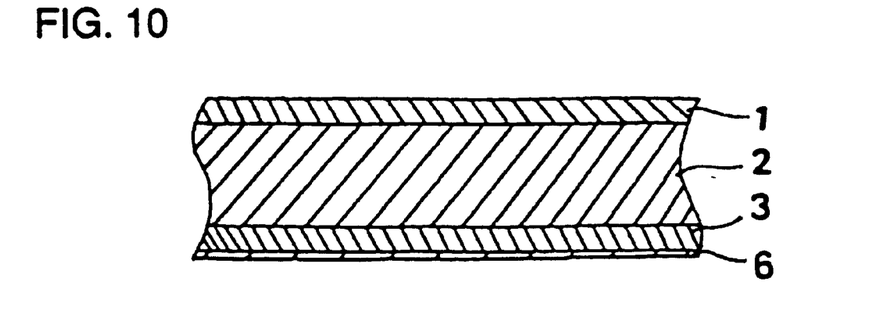
FIG. 10 is a fragmentary sectional view of the fuel electrode, the solid-electrolyte film, the air electrode, and the collecting layer of the comparative example 2.

FIG. 10 is a fragmentary sectional view of the obtained sintered body in which 1 denotes the fuel electrode, 2 denotes the solid-electrolyte film, 3 denotes the air electrode, and 6 denotes the collecting layer.

The respective manufacturing conditions of the fuel electrode, the solid-electrolyte film, the air electrode, the support layer and the collecting layer are summarized in Table 1 for Example 1, Comparative Example 1, and Comparative Example 2.

TABLE 1

| | Thickness ($\mu$m) | | | |
| --- | --- | --- | --- | --- |
| | Supported film system | | Self-standing film system | |
| | Example 1 | Example 2 | Comparative Example 1 | Comparative Example 2 |
| Fuel electrode | 50 | 50 | 50 | 50 |
| Solid-electrolyte film | 50 | 50 | 50 | 200 |
| Air electrode | 100 | 100 | 1000 | 50 |
| Support layer | 200 | 200 | 0 | 0 |
| Collecting layer | 100 | 100 | 10 | 10 |
| Total | 500 | 500 | 1110 | 310 |

As can be seen from Table 1, the thickness of the air electrode which is also used as the support layer in Comparative Example 1 is 1000 $\mu$m while the thickness of the air electrode supported by the independent support layer in the Examples 1 and 2 is 100 $\mu$m, which is 1/10 of the thickness of the air electrode in Comparative Example 1, and the total thickness (including the thickness of 200 $\mu$m of the support layer) is 300 $\mu$m, and a thickness of 1/3 or less that of the air electrode of the Comparative Example 1. The total thickness becomes 500 $\mu$m including that of the rest of components, i.e., the solid-electrolyte film of 50 $\mu$m, the fuel electrode of 50 $\mu$m, and the collecting electrode of 100 $\mu$m, which is 1/2 or less of the total thickness 1110 $\mu$m in Comparative Example 1. Compared with the total thickness 310 $\mu$m in Comparative Example 2, the total thickness in the Examples 1 and 2 increases to 500 $\mu$m. However, in the Examples 1 and 2, the thickness of the solid-electrolyte film can be reduced to 50 $\mu$m from 200 $\mu$m of Comparative Example 2, and the internal resistance of the cell is suppressed, and the cell performance is improved.

The collecting layer mediates contact between the electrode and an interconnector (not indicated in the figure), and is provided to suppress the loss of the current flowing in the electrode surface when the current generated in the vicinity of the center of the gas flow passage flows in the transverse direction of the electrode surface. In the case of the present embodiment, the air electrode is as thin as 100 $\mu$m, and the resistance when electrons flow is increased. The collecting layer is provided in order to cope with the increased resistance, and connect the electrode with the interconnector because the independent support layer is present between the electrode and the interconnector. In the case of the structure of Comparative Example 1, no independent support layer is provided and the resistance is small because the air electrode is as thick as 1000 $\mu$m, and there are some cases where no collecting layer is provided. The porosity of each air electrode and each collecting layer in the example embodiments and the Comparative Examples 1 and 2 is set to be approximately 40%.

Figure 11:
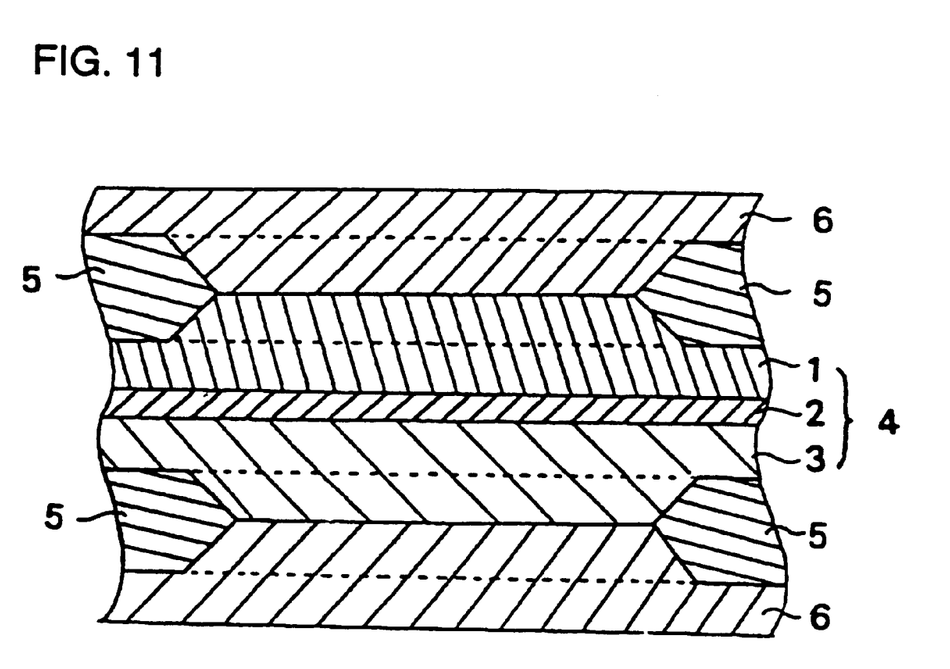
FIG. 11 is a fragmentary sectional view of the solid-electrolyte fuel cell in another embodiment of the present invention.

In the exemplified embodiments, the support layer is arranged on the air electrode side, but irrespective thereof, the support layer may be arranged on the fuel electrode side in the present invention. In addition, the support layer 5 having holes and the collecting layer 6 can be arranged on the fuel electrode 1 side and the air electrode 3 side, respectively, across the solid-electrolyte film 2 as indicated in the fragmentary sectional view of FIG. 11, and the fuel electrode 1 and the collecting layer 6, and the air electrode 3 and the collecting layer 6 are electrically connected to each other through the holes in the support layer 5. The collecting body of such a structure can be manufactured by any method of the green sheet system and the electrode material paste system in the present embodiments.

The thickness of the solid-electrolyte fuel cell of the supported film system can be reduced to 1/2 or less compared with that of the structure where the conventional air electrode or fuel electrode is the support layer. Thus, the volume of the solid-electrolyte fuel cell can be reduced to contribute to miniaturization of the cell, and the material cost associated therewith can also be reduced.

Compared with the self-standing film system in which the solid-electrolyte film is the support layer, similar supporting strength can be obtained, the thickness of the solid-electrolyte film can be reduced, and the internal resistance of the cell can be controlled.

In the present invention, an electrode of the three-layered film is not the support layer, but an independent support layer is employed, and the electric characteristics of the air electrode or the fuel electrode are not affected because of its structure. Thus, the coefficient of thermal expansion with the interconnector to be arranged opposite to the air electrode or the fuel electrode of the three-layered film can be easily regulated.

In addition, the air electrode or the fuel electrode can be electrically connected to the collecting layer by filling the electrode material of the air electrode, the fuel electrode or the collecting layer into the holes formed in the support layer in a relatively simple manufacturing method.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A solid-electrolyte fuel cell comprising:
   a three-layered film in which an air electrode film is arranged on one surface of a solid-electrolyte film and a fuel electrode film is arranged on another surface of said solid-electrolyte film;
   a collecting layer; and
   a support layer provided between said three-layered film and said collecting layer, said support layer having first and second surfaces and at least one hole formed in the thickness direction of the main surface of said support layer, the first surface bonded to an electrode film of the three-layered film and the second surface bonded to said collecting layer;
   wherein said collecting layer is electrically connected through said hole to the electrode bonded to said first surface and wherein said collecting layer is electrically connected through said holes to the electrode bonded to said first surface by a portion of at least one of said collecting layer and electrode extending into said hole.

2. The solid-electrolyte fuel cell of claim 1, wherein said support layer contains a plurality of said holes and wherein said collecting layer is electrically connected through a plurality of said holes to the electrode bonded to said first surface.

3. The solid-electrolyte fuel cell of claim 1, wherein the first surface is bonded to the air electrode film of the three-layered film.

4. The solid-electrolyte fuel cell of claim 1, wherein the first surface is bonded to the fuel electrode film of the three-layered film.

5. A solid-electrolyte fuel cell manufacturing method comprising providing a three-layered film in which an air electrode film is on one surface of a solid-electrolyte film and a fuel electrode is on the other surface of said solid-electrolyte film, providing a support layer having first and second surfaces and at least one hole in the thickness direction of the main surface thereof, arranging said first surface of said support layer on one electrode film surface of said three-layered film, arranging a collecting layer on said second surface of support layer to thereby form a multi-layered body, and said laminating said body under pressure to establish electrical communication between said electrode and said collecting layer through said holes.

6. The solid-electrolyte fuel cell manufacturing method of claim 5 wherein said support layer contains a plurality of said holes and electrical communication is established through a plurality of said holes.

7. The solid-electrolyte fuel cell manufacturing method of claim 6 wherein the first surface is bonded to the air electrode film of the three-layered film.

8. The solid-electrolyte fuel cell manufacturing method of claim 6 wherein the electrically communication through said holes is established by causing at least a portion of at least one of said collecting layer and electrode to extend into said hole.

9. The solid-electrolyte fuel cell manufacturing method of claim 6 wherein the electrically communication through said holes is established by providing an electrically conductive material disposed in said hole.

10. The solid-electrolyte fuel cell manufacturing method of claim 6 wherein the first surface is bonded to the fuel electrode film of the three-layered film.

11. The solid-electrolyte fuel cell manufacturing method of claim 6 wherein the layered film is baked prior to arranging the collecting layer on the second surface.

12. The solid-electrolyte fuel cell manufacturing method of claim 11 wherein an electrically conductive paste is introduced into said holes prior to baking.

* * * * *